US012680804B2

(12) United States Patent (10) Patent No.: US 12,680,804 B2

Ikeda et al. (45) Date of Patent: Jul. 14, 2026

(54) ROTATION ANGLE DETECTION DEVICE

(71) Applicant: Proterial, Ltd., Tokyo (JP)

(72) Inventors: Yukio Ikeda, Tokyo (JP); Masanori Sagawa, Tokyo (JP)

(73) Assignee: Proterial, Ltd., Tokyo (JP)

( * ) Notice: Subject to any disclaimer, the term of this patent is extended or adjusted under 35 U.S.C. 154(b) by 193 days.

(21) Appl. No.: 18/332,081

(22) Filed: Jun. 9, 2023

(65) Prior Publication Data

US 2023/0408247 A1 Dec. 21, 2023

(30) Foreign Application Priority Data

Jun. 15, 2022 (JP) ................................. 2022-096206

(51) Int. Cl.
| *G01B 7/30* | (2006.01) |
| *B62D 15/02* | (2006.01) |
| *G01D 5/14* | (2006.01) |

(52) U.S. Cl.
CPC ........... *G01B 7/30* (2013.01); *B62D 15/0215* (2013.01); *B62D 15/0245* (2013.01); *G01D 5/145* (2013.01)

(58) Field of Classification Search
CPC ...... G01B 7/30; G01D 5/145; B26D 15/0215; B26D 15/0245
See application file for complete search history.

(56) References Cited

U.S. PATENT DOCUMENTS

| 11,136,064 B2 * | 10/2021 | Nakajima | .......... | G01D 5/24485 |
| 11,608,106 B2 * | 3/2023 | Nakamura | .......... | B62D 5/0445 |

FOREIGN PATENT DOCUMENTS

| JP | 2003-344009 A | 12/2003 |
| JP | 2012-021890 A | 2/2012 |
| JP | 2019-221012 A | 12/2019 |
| JP | 2021-056078 A | 4/2021 |

OTHER PUBLICATIONS

An Office Action; "Notice of Reasons for Refusal," mailed by the Japanese Patent Office on Sep. 9, 2025, which corresponds to Japanese Patent Application No. 2022-096206 and is related to U.S. Appl. No. 18/332,081.

* cited by examiner

*Primary Examiner* — Reena Aurora

(74) *Attorney, Agent, or Firm* — Studebaker Brackett PLLC

(57) ABSTRACT

A rotation angle detection device includes at least one target rotating in unison with a shaft, a rotating member for rotating at a different rotation speed from the shaft as the shaft rotates, a first sensor whose output signal changes when the target is approached, a second sensor that detects the rotation angle of the rotating member within one rotation, and a computing section that calculates the absolute angle of the shaft based on the output signal of the first sensor and the rotation angle of the rotating member detected by the second sensor. The output signal of the first sensor changes at a period different from the rotation period of the rotating member when the shaft rotates, and the computing section detects the absolute angle of the shaft at that time from the rotation angle of the rotating member when the output signal of the first sensor changes.

8 Claims, 11 Drawing Sheets

ROTATION ANGLE OF STEERING SHAFT 11 (°)

*FIG. 8*

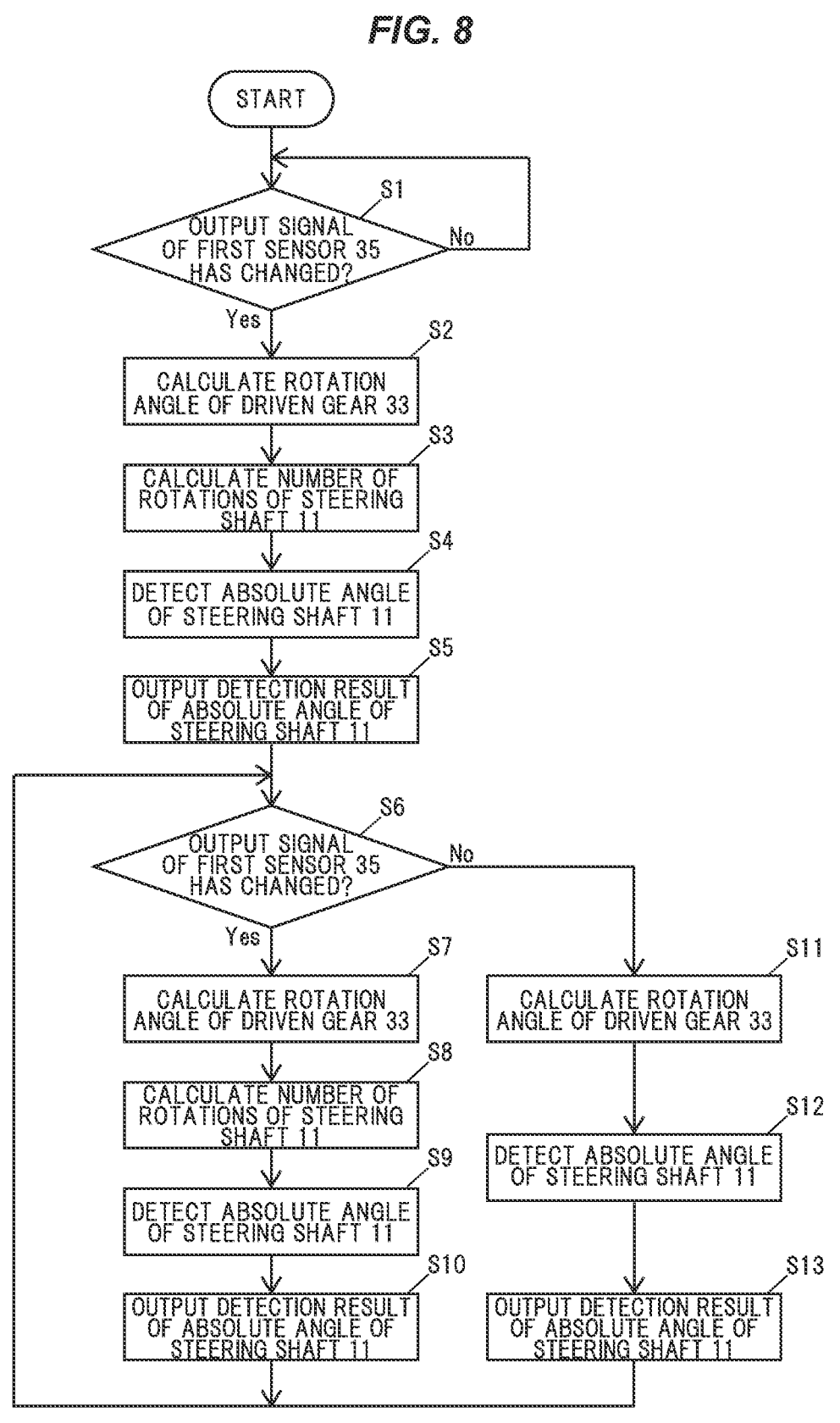

```
                        ┌─────────┐
                        │  START  │
                        └─────────┘
                             │
                             ▼                    S1
                    ◇─────────────────◇
                   ╱  OUTPUT SIGNAL    ╲    No
                  ◇   OF FIRST SENSOR 35 ◇──────┐
                   ╲  HAS CHANGED?      ╱        │
                    ◇─────────────────◇         │
                          │ Yes                 │
                          ▼           S2         │
                ┌───────────────────┐           │
                │ CALCULATE ROTATION │          │
                │ ANGLE OF DRIVEN GEAR 33│      │
                └───────────────────┘           │
                          │           S3         │
                ┌───────────────────┐           │
                │ CALCULATE NUMBER OF│          │
                │ ROTATIONS OF STEERING│        │
                │      SHAFT 11      │          │
                └───────────────────┘           │
                          │           S4         │
                ┌───────────────────┐           │
                │ DETECT ABSOLUTE ANGLE│        │
                │ OF STEERING SHAFT 11 │        │
                └───────────────────┘           │
                          │           S5         │
                ┌───────────────────┐           │
                │ OUTPUT DETECTION RESULT│      │
                │ OF ABSOLUTE ANGLE OF │        │
                │  STEERING SHAFT 11   │        │
                └───────────────────┘           │
                          │◄──────────────┐     │
                          ▼           S6   │     │
                    ◇─────────────────◇    │     │
                   ╱  OUTPUT SIGNAL    ╲ No │     │
                  ◇   OF FIRST SENSOR 35 ◇──┼─────┐
                   ╲  HAS CHANGED?      ╱    │     │
                    ◇─────────────────◇     │     │
               │ Yes                         │     │
               ▼         S7                  │     ▼            S11
     ┌───────────────────┐         ┌───────────────────┐
     │ CALCULATE ROTATION │        │ CALCULATE ROTATION │
     │ ANGLE OF DRIVEN GEAR 33│    │ ANGLE OF DRIVEN GEAR 33│
     └───────────────────┘         └───────────────────┘
               │         S8                        │       S12
     ┌───────────────────┐         ┌───────────────────┐
     │ CALCULATE NUMBER OF│        │ DETECT ABSOLUTE ANGLE│
     │ ROTATIONS OF STEERING│      │ OF STEERING SHAFT 11 │
     │      SHAFT 11      │        └───────────────────┘
     └───────────────────┘                   │       S13
               │         S9         ┌───────────────────┐
     ┌───────────────────┐         │ OUTPUT DETECTION RESULT│
     │ DETECT ABSOLUTE ANGLE│      │ OF ABSOLUTE ANGLE OF │
     │ OF STEERING SHAFT 11 │      │  STEERING SHAFT 11   │
     └───────────────────┘         └───────────────────┘
               │         S10
     ┌───────────────────┐
     │ OUTPUT DETECTION RESULT│
     │ OF ABSOLUTE ANGLE OF │
     │  STEERING SHAFT 11   │
     └───────────────────┘
```

ROTATION ANGLE DETECTION DEVICE

CROSS-REFERENCE TO RELATED APPLICATIONS

The present patent application claims the priority of Japanese patent application No. 2022-096206 filed on Jun. 15, 2022, and the entire contents thereof are hereby incorporated by reference.

TECHNICAL FIELD

The present invention relates to a rotation angle detection device that detects the absolute angle of a rotating shaft over multiple revolutions.

BACKGROUND OF THE INVENTION

Conventionally, for example, a rotation angle detection device described in Patent Literature 1 is known as a device for detecting the rotation angle of a steering shaft connected to a steering member of a vehicle. This rotation angle detection device includes a main gear fixed to a steering shaft, a first gear and a second gear meshing and rotating with the main gear, a magnet fitted to the first gear, a magnet fitted to the second gear, a first magnetic detection element for detecting a magnetic field of the magnet fitted to the first gear, and a second magnetic detection element for detecting the magnetic field of the magnet fitted to the second gear. The first and the second gears differ from each other in pitch circle diameter and the number of teeth and rotate at different speeds as the steering shaft rotates. This makes it possible to detect the absolute angle of the multi-rotating steering shaft because the relationship of the relative rotation angles of the first and the second gears changes with the rotation number of the steering shaft.

Citation List Patent Literature 1: JP2021-56078A

SUMMARY OF THE INVENTION

The rotation angle detection device described in Patent Literature 1 requires a large installation space because the first and the second gears are arranged around the outer periphery of the shaft as a rotation angle detection object. In particular, when the rotation angle detection device described in Patent Literature 1 is mounted on a vehicle and used to detect the rotation angle of the steering shaft, the large installation space may cause problems in vehicle mounting.

The present invention was made in view of the above circumstances, and its object is to provide a rotation angle detection device with a small installation space. A further object of the present invention is to provide a rotation angle detection device that can be low-cost.

The present invention provides a rotation angle detection device for detecting the absolute angle of a shaft rotating with respect to a non-rotating member over a plurality of revolutions, comprising:

at least one target rotating in unison with the shaft;

a rotating member for rotating at a different rotation speed from the shaft as the shaft rotates;

a first sensor whose output signal changes when the target is approached;

a second sensor that detects a rotation angle of the rotating member within one rotation; and a computing section that calculates the absolute angle of the shaft based on the output signal of the first sensor and the rotation angle of the rotating member detected by the second sensor, wherein the output signal of the first sensor changes at a period different from a rotation period of the rotating member when the shaft rotates, and wherein the computing section detects the absolute angle of the shaft at that time from the rotation angle of the rotating member when the output signal of the first sensor changes.

Effects of the Invention

According to the present invention, the installation space of the rotation angle detection device can be reduced. Also, according to the present invention, the rotation angle detection device can be reduced in cost.

BRIEF DESCRIPTION OF DRAWINGS

FIG. 1 is a schematic configuration diagram of a vehicle steering system in which the steering angle is detected by the rotation angle detection device according to the first embodiment of the invention.

FIG. 8 is a flow chart showing an example of a processing executed by the CPU of the computing section.

DETAILED DESCRIPTION OF THE INVENTION

First Embodiment

Figure 1:
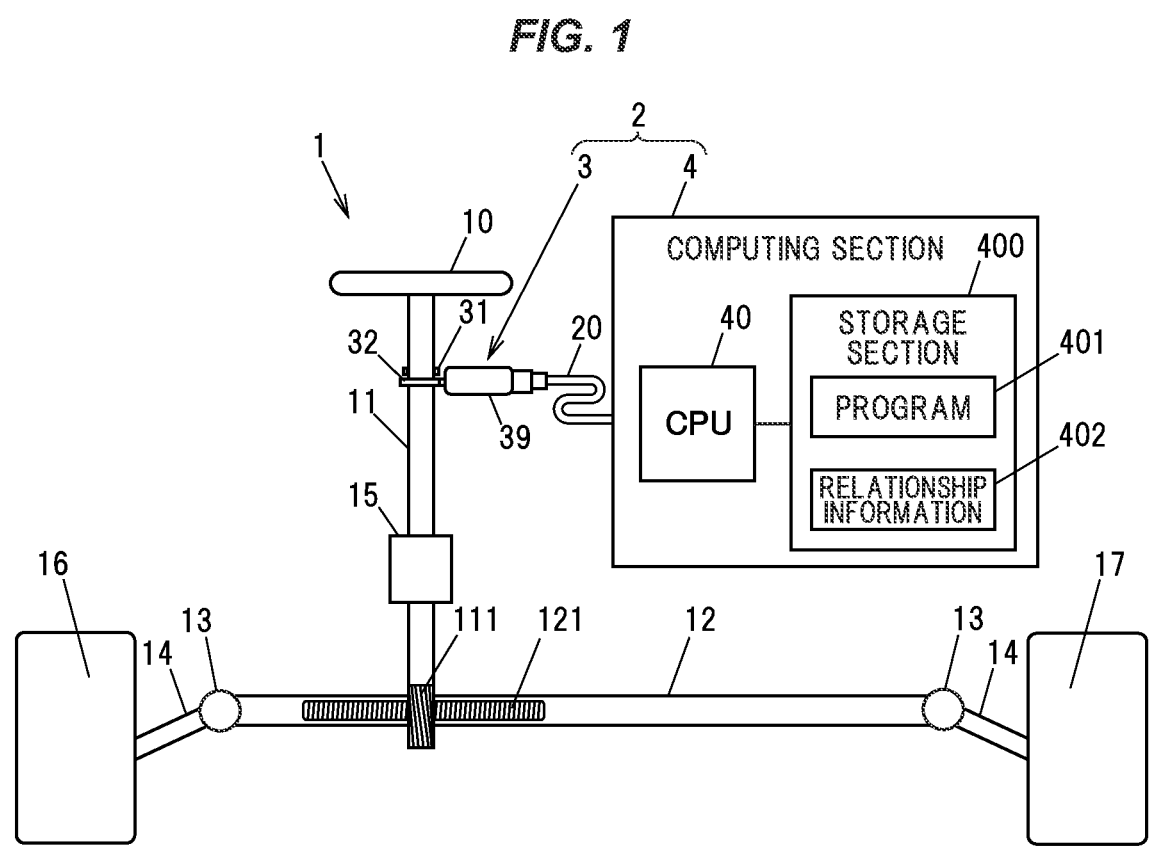
Figure 2:
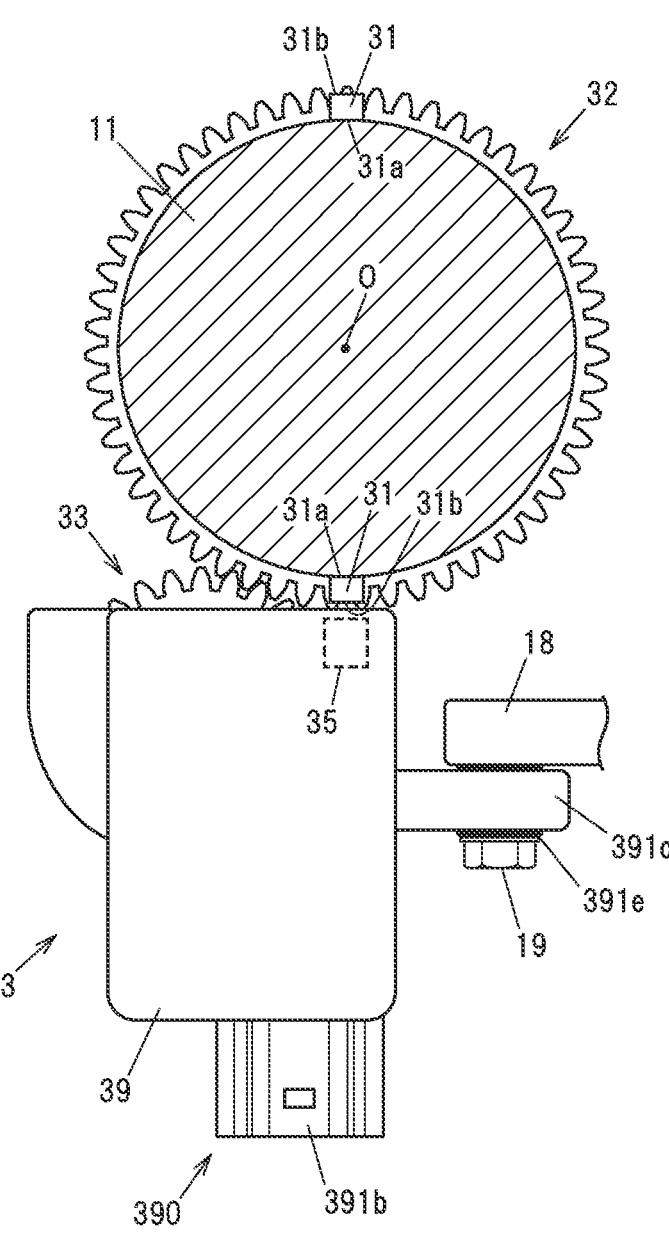
FIG. 2 is a configuration diagram showing the sensor unit of the rotation angle detection device together with the steering shaft and the mounting stay as a non-rotating member.

FIG. 1 is a schematic configuration diagram of a steering device 1 for a vehicle in which the steering angle is detected by the rotation angle detection device 2 according to the first embodiment of the invention. The vehicle steering device 1 includes a steering wheel 10, which is a steering member operated by the driver, a steering shaft 11 connected to the steering wheel 10, a rack shaft 12 supported to be movable forward and backward along the vehicle width direction, a pair of ball joints 13 fitted to both ends of the rack shaft 12, a pair of tie rods 14 swingably connected to the rack shaft 12 respectively by the pair of ball joints 13, and a steering assist device 15 that applies a steering assist force to the steering shaft 11 to assist steering operation of the steering wheel 10.

The steering shaft 11 is the shaft as a rotation angle detection object, i.e., the object of which rotation angle is to be detected, by the rotation angle detection device 2. The steering assist device 15 applies a steering assist force to the steering shaft 11 in accordance with the rotation angle (steering angle) detected by the rotation angle detection device 2 and the steering torque applied to the steering wheel 10.

The steering shaft 11 is connected to the steering wheel 10 at one end in the longitudinal direction and has a pinion gear 111 at the other end in the longitudinal direction. The rack shaft 12 has a rack gear 121 that meshes with the pinion gear 111. When the steering wheel 10 is steered, the steering shaft 11 rotates with the steering wheel 10 and the rack shaft 12 moves in the vehicle width direction. This causes the left and right steering wheels 16, 17 to be steered.

The rotation angle detection device 2 has a sensor unit 3 mounted near the steering shaft 11, a computing section 4, and a cable 20 connecting the sensor unit 3 and the computing section 4. The computing section 4 has a CPU (arithmetic processing unit) 40 and a storage section 400 composed of nonvolatile storage. The storage section 400 stores a program 401 to be executed by the CPU 40 and relationship information 402 to be described below.

Figure 3:
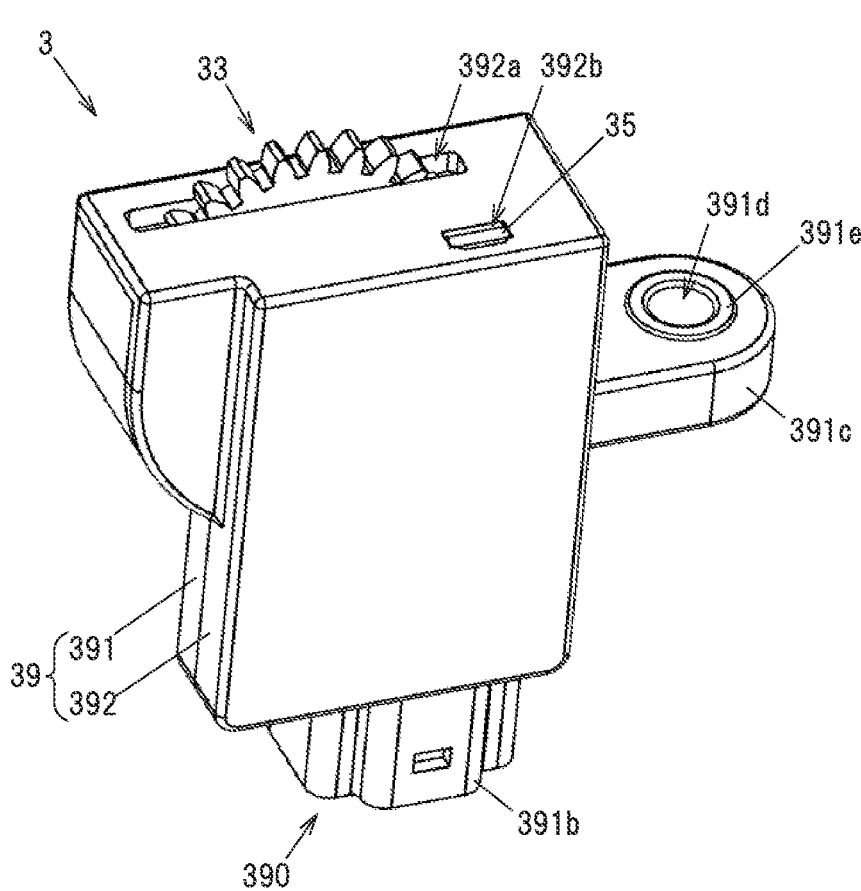
FIG. 3 is a perspective view of the sensor unit.
Figure 4:
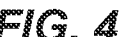
FIG. 4 is an exploded perspective view of the sensor unit.
Figure 5:
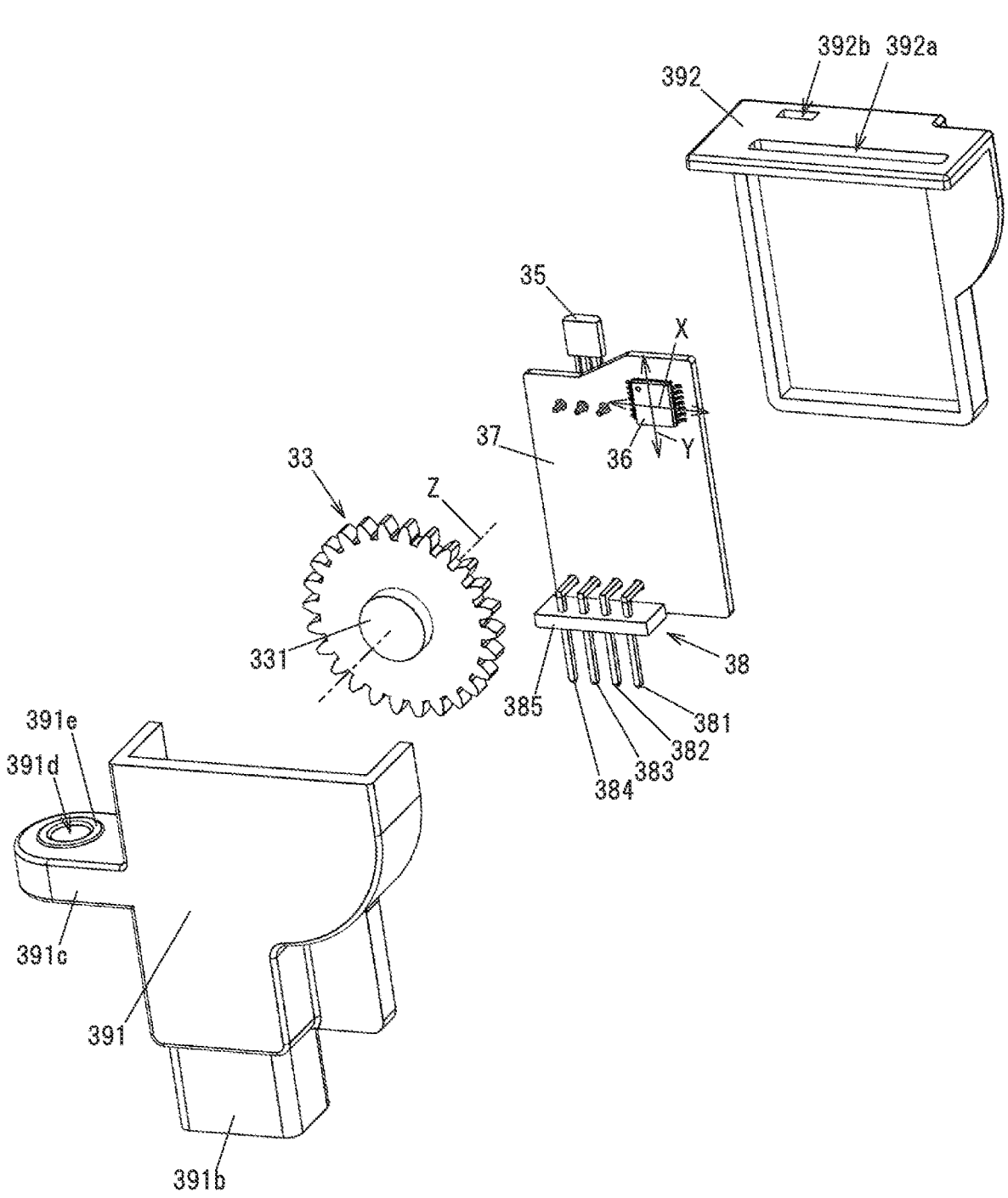
FIG. 5 is an exploded perspective view of the sensor unit viewed from a different direction from FIG. 4.

FIG. 2 is a configuration diagram showing the sensor unit 3 of the rotation angle detection device 2 together with the steering shaft 11 and the mounting stay 18 as a non-rotating member. FIG. 3 is a perspective view of the sensor unit 3. FIG. 4 is an exploded perspective view of the sensor unit 3. FIG. 5 is an exploded perspective view of the sensor unit 3 from a different direction from FIG. 4.

The sensor unit 3 includes a target 31 that rotates together with the steering shaft 11, a drive gear 32 that is provided around the outer periphery of the steering shaft 11 and rotates together with the steering shaft 11, a driven gear 33 as a rotating member, that rotates at a different rotational speed from the steering shaft 11 as the steering shaft 11 rotates, a magnet 34 fixed to the center of the driven gear 33, a first sensor 35 whose output signal changes when the target 31 approaches, a second sensor 36 that detects the rotation angle within one rotation of the driven gear 33, a substrate 37 on which the first sensor 35 and the second sensor 36 are mounted, a terminal portion 38 having a plurality of connector pins 381 to 384, and a case member 39 that is fixed to the mounting stay 18 by bolts 19.

The mounting stay 18 is, for example, part of a steering member of a car body, but the object of attachment of the case member 39 is not limited to this, and the case member 39 can be fitted to various non-rotating parts that do not rotate with respect to the car body. The rotation angle detection device 2 detects the absolute angle of the steering shaft 11 over multiple rotations. In this embodiment, there is described the case where the rotation angle of the steering shaft 11 when the steering wheel 10 is in the neutral position (the position where the vehicle drives straight ahead) is 0 degrees, and within a range of three rotations of the steering shaft 11 with the steering wheel 10 (in the range from −1080 degrees to 1080 degrees) to the right and left respectively, the rotation angle detection device 2 can detect the absolute angle of the steering shaft 11.

In this embodiment, as shown in FIG. 2, two targets 31 are fixed to an outer periphery surface of the steering shaft 11 at equal intervals in the circumferential direction. In other words, the two targets 31 are fixed every 180 degrees around the rotation axis O of the steering shaft 11. However, the number of targets 31 is not limited to this, and may be three or more, or even one. In other words, at least one target 31 should be fixed to the steering shaft 11.

In this embodiment, the target 31 is a dipole magnet having different magnetic properties on surface 31a closer to the outer periphery surface of the steering shaft 11 and on an opposite side 31b, and the first sensor 35 is a magnetic field switch that outputs a pulse signal when the target 31 approaches. The target 31 can be, e.g., a ferrite, neodymium, samarium cobalt, or alnico magnet. As the first sensor 35, a Hall element can be used, for example. A ring magnet having a plurality of magnetic poles and mated externally to the steering shaft 11 can be used as the target 31.

Figures 6A, 6B:
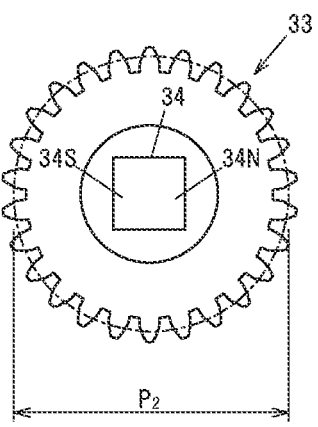
FIG. 6A is a configuration diagram of the drive gear viewed from its axial direction.
FIG. 6B is a configuration diagram of the driven gear together with the magnet, viewed from its axial direction.

FIG. 6A is a configuration diagram of the drive gear 32 viewed from its axial direction. FIG. 6B is a configuration diagram of the driven gear 33 together with the magnet 34 viewed from its axial direction. The drive gear 32 and the driven gear 33 are made of non-magnetic material, more specifically, injection molded resin. The driven gear 33 meshes with the drive gear 32 and rotates at a faster speed than the drive gear 32 as the steering shaft 11 rotates. The driven gear 33 has fewer teeth than the drive gear 32, and the pitch circle diameter P2 of the driven gear 33 is smaller than one-half the pitch circle diameter P1 of the drive gear 32. In the present case, the number of teeth of the drive gear 32 is 55 and the number of teeth of the driven gear 33 is 26 and the gear ratio between the drive gear 32 and the driven gear 33 (the number of teeth of the drive gear 32 divided by the number of teeth of the driven gear 33) is about 2.1.

The magnet 34 is a two-pole magnet with N pole 34N and S pole 34S aligned in the diameter direction of the driven gear 33, and is made of ferrite, neodymium, samarium cobalt, or alnico magnet, for example. The second sensor 36 is a magnetic field sensor capable of detecting the intensity of magnetic fields in two directions perpendicular to the rotation axis of the driven gear 33 and is positioned opposite the magnet 34. For example, a Hall element, a GMR (Giant Magneto Resistive effect) element, or a TMR (Tunneling Magneto Resistive) element can be used as the second sensor 36.

As shown in FIG. 5, when the rotation axis of the driven gear 33 is the Z-axis and the two directions of the magnetic field detectable by the second sensor 36 are the X-axis and Y-axis, the X, Y, and Z axes are orthogonal to each other. The computing section 4 can calculate the rotation angle of the driven gear 33 within one rotation by acquiring the detection results of the direction and intensity of the magnetic fields in the X-axis and Y-axis directions generated by the magnet 34 from the second sensor 36. The computing section 4 calculates the rotation angle of the driven gear 33 using the angle of the driven gear 33 when the steering wheel 10 is in the neutral position as 0 degrees.

The substrate 37 is a printed circuit board based on a flat dielectric material, such as glass epoxy, and is housed in a case member 39. The terminal portion 38 has first to fourth connector pins 381-384 connected to the substrate 37 and a fixing member 385 made of resin. The first to fourth connector pins 381-384 are fixed to the fixing member 385 and are arranged in a row along the edge of the substrate 37. The first to fourth connector pins 381-384 and the first sensor 35 and the second sensor 36 are connected by an unshown wiring pattern formed on the substrate 37. The first connector pin 381 is, e.g., a power pin, and the second connector pin 382 is, e.g., an electrically grounded ground pin. The third connector pin 383 is, for example, a signal pin that transmits the output signal of the first sensor 35 to the computing section 4, and the fourth connector pin 384 is, for example, a signal pin that transmits the output signal of the second sensor 36 to the computing section 4.

The case member 39 has a case body 391 and a case lid 392 made of resin, and the case body 391 and the case lid 392 are joined together, for example by adhesion or ultrasonic welding. The case body 391 has a recess 391*a* in which a boss portion 331 provided in the center of the driven gear 33 mates. The driven gear 33 is rotatably supported against the case member 39 by the boss portion 331 being mated into the recess 391*a*.

A connector housing portion 391*b* and a flange portion 391*c* are formed in the case body 391. The connector housing portion 391*b*, together with the terminal portion 38, constitutes the connector portion 390 of the case member 39. The connector housing portion 391*b* is mated with the connector portion of the cable 20, and the conductors of the cable 20 are electrically connected to the first through fourth connector pins 381 to 384 of the terminal portion 38. The flange portion 391*c* has bolt insertion holes 391*d* for inserting bolts 19 for fixing the case member 39 to the mounting stay 18. The bolt insertion hole 391*d* is reinforced by a metal collar 391*e*.

The case lid 392 has a slit-shaped opening 392*a* for protruding a portion of the driven gear 33 and a window 392*b* for accommodating a portion of the first sensor 35. The driven gear 33 has a circumferential part protruding from the opening 392*a* to the outside of the case member 39, and this protruding part engages the drive gear 32. The first sensor 35 has a shorter minimum distance from the target 31 due to the fact that a portion of it is housed in the window 392*b*, which enhances the detection accuracy when detecting the approach of the target 31.

The computing section 4 calculates the absolute angle of the steering shaft 11 in a predetermined angular range (from −1080 to 1080 degrees in this embodiment) based on the output signal of the first sensor 35 and the rotation angle of the driven gear 33 detected by the second sensor 36. The absolute angle of the steering shaft 11 can be obtained by adding the product of the number of revolutions of the steering shaft 11 from when the steering wheel 10 is in the neutral position multiplied by 360 and the rotation angle within one revolution of the driven gear 33 detected by the second sensor 36 divided by the gear ratio.

As mentioned above, the number of teeth differs between the drive gear 32 and the driven gear 33, so when the steering shaft 11 rotates, the output signal of the first sensor 35 changes at a different period than the rotation period of the driven gear 33. The gear ratio between the drive gear 32 and the driven gear 33 is not an integer multiple but a non-integer multiple, and the rotation angle of the driven gear 33 when the output signal of the first sensor 35 changes at each of the first to third rotations from the neutral position of the steering wheel 10 in the right direction and the first to third rotations in the left direction is different. Therefore, the rotation angle of the driven gear 33 detected by the second sensor 36 when the output signal of the first sensor 35 changes can be used to determine the number of rotations of the steering shaft 11 at that time.

Here, the number of rotations of the steering shaft 11 is a positive or negative integer value, with 1 being when one rotation of the steering shaft 11 from the neutral position of the steering wheel 10 to the right (360 degrees rotation) is completed and 2 being when two rotations in the same direction (720 degrees rotations) are completed. When one rotation (−360 degree rotation) of the steering shaft 11 in the left direction from the neutral position of the steering wheel

10 is completed is designated as −1, and when two rotations (−720 degree rotations) in the same direction are completed is designated as −2.

Based on the rotation angle of the driven gear 33 when the output signal of the first sensor 35 changes, the computing section 4 refers to the relationship information 402 stored in the storage section 400 to detect the absolute angle of the steering shaft 11 at that time. The relationship information 402 shows information on the rotation angle of the driven gear 33 when the output signal of the first sensor 35 changes in each of the first to third turns from the neutral position of the steering wheel 10 in the right direction and in the left direction.

The conditions for the gear ratio and the angular interval of the target 31 for the computing section 4 to calculate the absolute angle of the steering shaft 11 in a predetermined angular range are explained here with reference to Formulas (1) to (3). In Formulas (1) to (3), $\alpha$ is the gear ratio between the drive gear 32 and the driven gear 33, $\Psi$ is the angular spacing of the target 31 in the circumferential direction of the steering shaft 11 (180 degrees in this embodiment), and N is the maximum absolute value of the steering shaft 11 rotation angle in the predetermined angular range from 0 degrees to N is the number of rotations of the steering shaft 11 between 0 degrees and the maximum absolute value in a given angular range (1080 degrees in this embodiment), which is 3 in this embodiment.

The rotation amount R of the driven gear 33 when the steering shaft 11 turns N from the neutral position of the steering wheel 10 is given by Formula (1).

Formula 1

$$R = 360 \times n \times \alpha \tag{1}$$

The angular deviation of the output signal of the first sensor 35 from the neutral position with respect to the rotation amount R in this case is $\Delta\theta$, which is given by Formula (2).

Formula 2

$$\Delta\theta = 360 \times n \times \alpha - 360 \times n \times \frac{360}{\psi} \tag{2}$$

In order to detect the absolute angle of the steering shaft 11 with the output signal of the first sensor 35, this $\Delta\theta$ must be within the range of one rotation of the driven gear 33 (within ±180 degrees). Therefore, $\alpha$, $\Psi$, and N must be set to satisfy Formula (3).

Formula 3

$$\Delta\theta = 360 \times N \times \left( \alpha - \frac{360}{\psi} \right) < 180 \tag{3}$$

Figure 7:
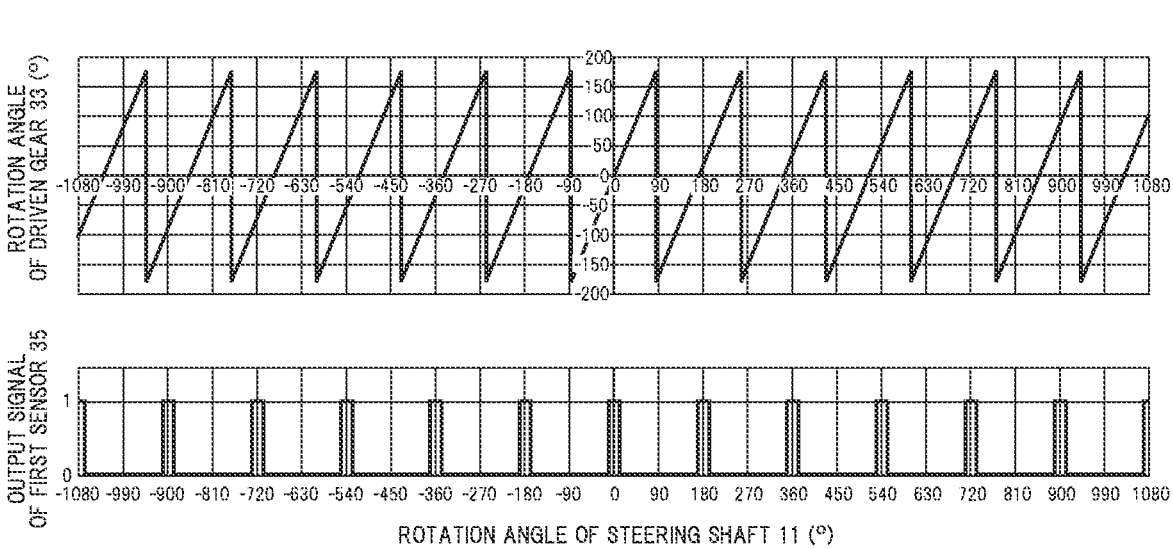
FIG. 7 is a graph showing the rotation angle of the driven gear and the output signal of the first sensor in the detection range of the absolute angle of the steering shaft.

FIG. 7 is a graph showing the rotation angle of the driven gear 33 and the output signal of the first sensor 35 in the detection range of the absolute angle of the steering shaft 11 (from −1080 to 1080 degrees). For the output signal of the first sensor 35, the output signal of the first sensor 35 when the first sensor 35 and the target 31 are in proximity is set at 1 and the output signal when they are not in proximity is set at 0.

As shown in this graph, the rotation angle of the driven gear 33 when the output signal of the first sensor 35 rises from 0 to 1 depends on the number of rotations of the steering shaft 11, respectively. In the example shown in FIG. 7, the rotation angle of the driven gear 33 when the output signal of the first sensor 35 rises from 0 to 1 is larger, as the rotation angle of the steering shaft 11 is larger in the range where the rotation angle of the steering shaft 11 is larger than 0, and is smaller (closer to −180 degrees) as the rotation angle of the steering shaft 11 is smaller (closer to −1080 degrees) in the range where the rotation angle of the steering shaft 11 is smaller than 0.

In this embodiment, as shown in FIG. 7, the output signal of the first sensor 35 changes in the vicinity of the neutral position of the steering wheel 10. In the example shown in FIG. 7, the output signal of the first sensor 35 is 1 when the steering wheel 10 is in the neutral position, and when the steering wheel 10 is steered in any direction from the neutral position, the output signal of the first sensor 35 changes to 0, allowing detection of the absolute angle of the steering shaft 11 at that time. This makes it possible to detect the absolute angle of the steering shaft 11 promptly after the vehicle's startup switch (e.g., ignition switch) is turned on, power is supplied to the computing section 4 and the sensor unit 3, and the vehicle begins to run. The output signal of the first sensor 35 should change at least once between 0 and 90 degrees of absolute steering angle.

As shown in FIG. 7, the output signal of the first sensor 35 changes at least once during one rotation of the driven gear 33, so that even if the vehicle's start switch is turned on while the steering wheel 10 is turned significantly to the right or left and the vehicle begins traveling, it is prevented from traveling a long distance without detecting the absolute angle of the steering shaft 11.

FIG. 8 is a flow chart showing an example of a processing performed by the CPU 40 of the computing section 4 after the vehicle's start switch is turned on. In the processing shown in this flow chart, the CPU 40 first waits for the output signal of the first sensor 35 to change (step S1), and when the output signal of the first sensor 35 changes, the rotation angle of the driven gear 33 at that time is calculated based on the detection result of the second sensor 36 (step S2). Then, based on the obtained rotation angle of the driven gear 33, the number of rotations of the steering shaft 11 is obtained by referring to the relationship information 402 (step S3), and the absolute angle of the steering shaft 11 is detected from the obtained number of rotations and the rotation angle of the driven gear 33 (step S4). Then, information on the detection result of the absolute angle of the steering shaft 11 is output to the outside (step S5).

Thereafter, the CPU 40 determines at each predetermined control cycle whether the output signal of the first sensor 35 has changed or not (step S6), and if the output signal of the first sensor 35 has changed since the previous control cycle, the same processing as steps S2 through S5 is performed as steps S7 through S10. On the other hand, if the output signal of the first sensor 35 has not changed since the previous control cycle, the CPU 40 calculates the rotation angle of the driven gear 33 based on the detection result of the second sensor 36 (step S11) and detects the absolute angle of the steering shaft 11 from the latest number of rotations of the steering shaft 11 obtained in the previous control cycle or the more previous control cycle and the rotation angle of the driven gear 33 calculated in step S11 (step S12), and outputs information on the detection result of the absolute angle of the steering shaft 11 to an external device (step S13).

The change in the output signal of the first sensor 35 in the processing of steps S1 and S6 may be a rise from 0 to 1, a fall from 1 to 0, or both. The time interval (the control cycle described above) at which the CPU 40 executes the processing of step S1 or step S6, set shorter than the pulse width of the output signal of the first sensor 35 when the steering wheel 10 is quickly rotated. The output destination of the detection result of the absolute angle of the steering shaft 11 in the processing of steps S5, S10, and S13 is, for example, the steering assist device 15, but it may instead also be, for example, a stability control device that controls the behavior of the vehicle to stabilize it.

According to the first embodiment described above, the installation space can be reduced compared to the case where the first and the second gears are arranged around the outer periphery of the shaft as in the conventional rotation angle detection device described above. Also, since only one driven gear 33 and one second sensor 36 are required, the cost can be reduced.

Second Embodiment

Figure 9:
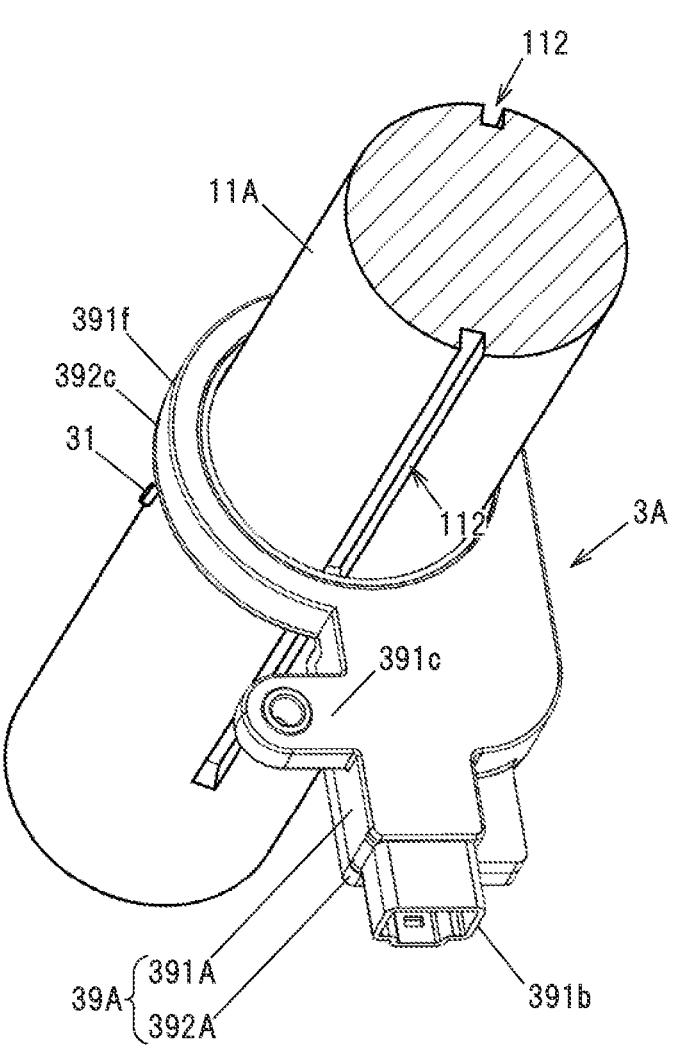
FIG. 9 is a perspective view showing the sensor unit and the steering shaft according to the second embodiment of the invention.
Figure 10:
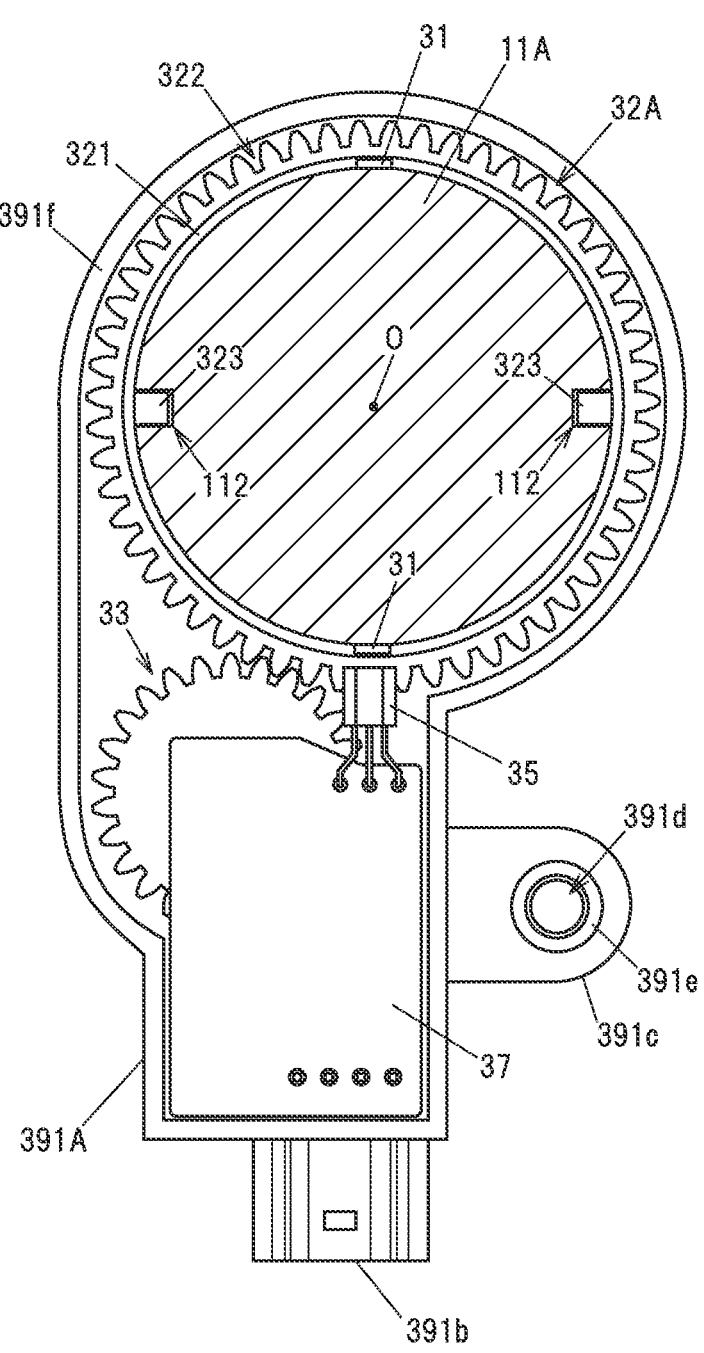
FIG. 10 is a configuration diagram showing the interior of the sensor unit together with a cross-section of the steering shaft.
Figure 11:
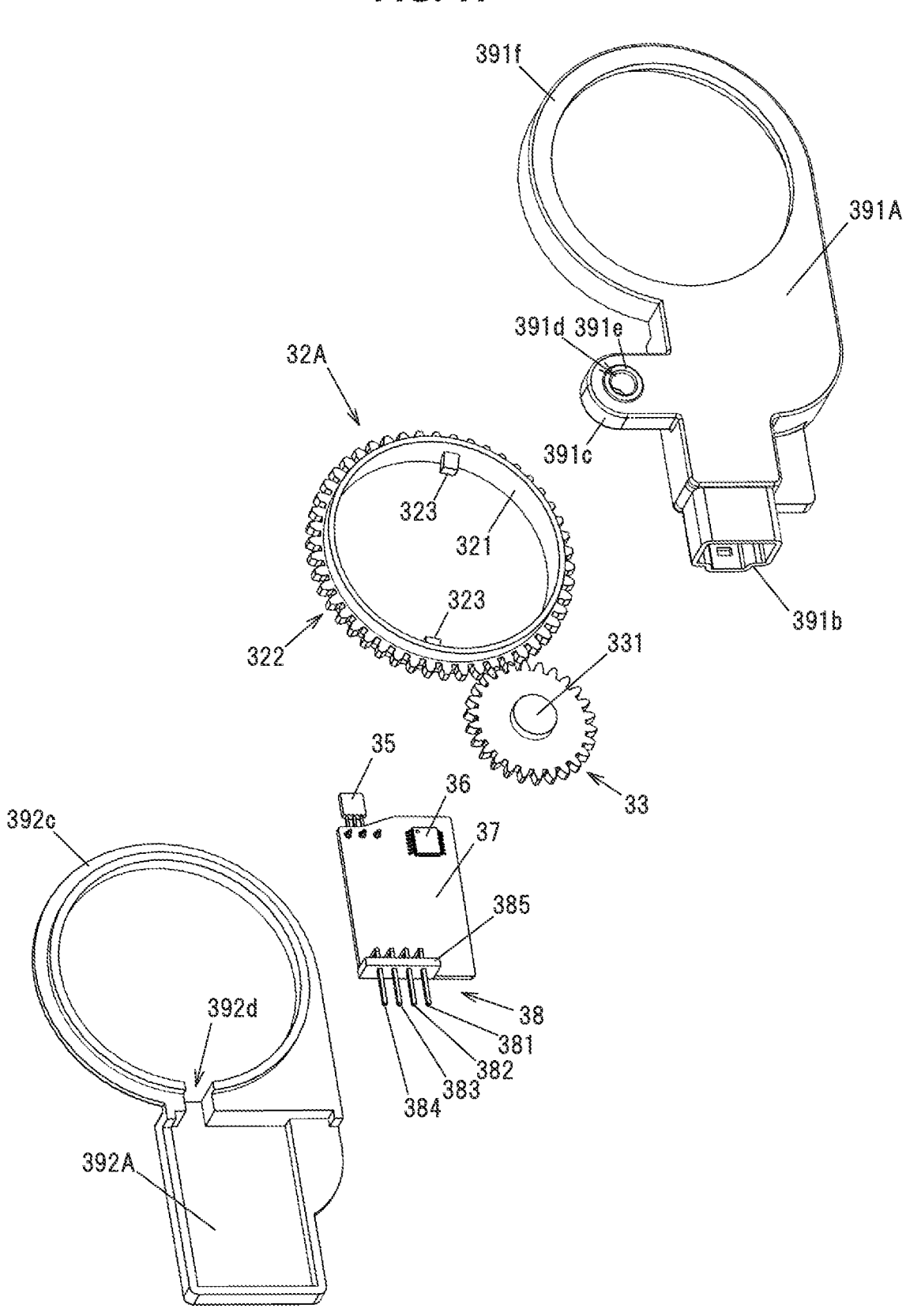
FIG. 11 is an exploded perspective view of the sensor unit.

Next, the rotation angle detection device according to the second embodiment of the invention will be described. The rotation angle detection device in the second embodiment differs from the sensor unit 3A in the first embodiment in the configuration of the sensor unit 3A. The configuration of this sensor unit 3A and the steering shaft 11A, which is the shaft for which the rotation angle is to be detected, will be explained below with reference to FIGS. 9 to 11. In FIGS. 9 to 11, components that are common to those described for the first embodiment will be marked with the same characters as those in FIGS. 2 to 5, and redundant explanations will be omitted.

FIG. 9 is a perspective view of the sensor unit 3A fitted to the steering shaft 11A. FIG. 10 is a configuration diagram showing the interior of the sensor unit 3A together with a cross-section of the steering shaft 11A. FIG. 11 is an exploded perspective view of sensor unit 3A.

In the first embodiment, the drive gear 32 has been located outside the case member 39, but in this embodiment, the drive gear 32A is held in a case member 39A of the sensor unit 3A. The case member 39A has a case body 391A and a case lid 392A. Between the case body 391A and the case lid 392A, a substrate 37 on which the first sensor 35, the second sensor 36 and the terminal portion 38 are mounted, as well as the driven gear 33 are housed.

The drive gear 32A is made of resin, for example, and integrally comprises a ring-shaped base portion 321, a gear portion 322 provided on the outer periphery of the base portion 321, and a plurality of locking projections 323 provided on the inner periphery of the base portion 321. The base portion 321 and the gear portion 322 of the drive gear 32A are housed in the drive gear housing portion 391f of the case body 391A and the drive gear housing portion 392c of the case lid 392A. The drive gear housing portions 391f and 392c are each formed in an annulus surrounding the steering shaft 11A.

A plurality of engagement grooves 112 are formed in the steering shaft 11A, each of which engages a plurality of locking projections 323 of the drive gear 32A, and the drive gear 32A is stopped from turning around the steering shaft 11A by engaging the locking projections 323 in the engagement grooves 112. The engagement grooves 112 extend parallel to the axial direction of the steering shaft 11A. When installing the sensor unit 3A on the steering shaft 11A, the steering shaft 11A is inserted inside the drive gear housing portions 391f, 392c, and a plurality of locking projections 323 are engaged with each of the plurality of engagement grooves 112.

The output signals of the first sensor 35 and the second sensor 36 of the sensor unit 3A are transmitted to the computing section 4 as in the first embodiment, and the absolute angle of the steering shaft 11A is detected based on these output signals. The case lid 392A has a window 392d, that accommodates a portion of the second sensor 36 in a circumferential portion of the drive gear housing portion 392c.

This second embodiment provides the same effect as the first embodiment. Since the drive gear 32A is held in the case member 39A of the sensor unit 3A, mounting of the sensor unit 3A on the steering shaft 11A is facilitated.

Summary of the Embodiments

Next, the technical concepts grasped from the first and the second embodiments explained above will be described with the aid of the characters, etc. in each embodiment. However, each character in the following description does not limit the components in the scope of claims to the parts, etc. specifically shown in the embodiments.

According to the first feature, a rotation angle detection device 2 for detecting an absolute angle of a shaft (steering shaft 11, 11A) rotating with respect to a non-rotating member (mounting stay 18) over a plurality of revolutions includes at least one target 31 rotating in unison with the shaft 11, 11A, a rotating member (driven gear 33) that rotates at a different rotational speed from the shaft 11, 11A as the shaft 11, 11A rotates, a first sensor 35 whose output signal changes when the target 31 is approached, a second sensor 36 that detects a rotation angle of the rotating member 33 within one rotation, and a computing section 4 that calculates the absolute angle of the shaft 11, 11A based on the output signal of the first sensor 35 and the rotation angle of the rotating member 33 detected by the second sensor 36, wherein the output signal of the first sensor 35 changes at a period different from a rotation period of the rotating member 33 when the shaft 11, 11A rotates, and the computing section 4 detects the absolute angle of the shaft 11, 11A at that time by the rotation angle of the rotating member 33 when the output signal of the first sensor 35 changes.

According to the second feature, the rotation angle detection device 2 described in the second feature, further includes a drive gear 32 provided on an outer periphery of the shaft 11, 11A and rotating together with the shaft 11, 11A, and the rotating member 33 is a driven gear 33 meshing with the drive gear 32 and rotating.

According to the third feature, in the rotation angle detection device 2 as described in the second feature, a pitch circle diameter P2 of the driven gear 33 is smaller than one-half a pitch circle diameter P1 of the drive gear 32.

According to the fourth feature, the rotation angle detection device 2 as described in the second or third feature, further includes a case member 39, 39A fixed to the non-rotating member 18, wherein a portion of the rotating member 33 protrudes through an opening 392a formed in the case member 39, 39A, and the protruding portion of the rotating member 33 meshes with the drive gear 32.

According to the fifth feature, in the rotation angle detection device 2 described in the first feature, the target 31 is a magnet fixed to the shaft 11, 11A, and the first sensor 35 is a magnetic field switch that outputs a pulse signal when the target 31 approaches.

According to the sixth feature, the rotation angle detection device 2 described in the fifth feature, further includes a case member 39, 39A fixed to the non-rotating member 18, wherein a portion of the first sensor 35 is housed in a window portion 392b formed in the case member 39, 39A.

According to the seventh feature, in the rotation angle detection device 2 described in the first feature, a magnet 34 is fixed to a center of the rotating member 33, and the second sensor 36 is a magnetic field sensor capable of detecting intensities of magnetic fields in two directions perpendicular to a rotation axis of the rotating member 33.

According to the eighth feature, in the rotation angle detection device 2 described in the first feature, the shaft 11, 11A is a steering shaft connected to a steering member (steering wheel 10) of a vehicle, and the output signal of the first sensor 35 changes near a neutral position of the steering member 10.

The first and the second embodiments of the invention have been described above, but each of the embodiments described above does not limit the invention as claimed in the claims. It should also be noted that not all of the combinations of features described in the embodiments are essential for the invention to solve the problems of the invention. In addition, the invention can be implemented with appropriate modifications as long as they do not depart from the intent of the invention, for example, the invention can be modified as follows.

In the above embodiments, the case in which the driven gear 33 as a rotating member meshes and rotates with the drive gear 32 is described, but the rotating member is not limited to this, and may rotate at a different rotational speed from the steering shaft 11 as the steering shaft 11 rotates, for example, by a belt drive, for example. The shaft as the rotation angle detection object is not limited to the steering shaft 11, but various shafts for vehicles and industrial machines, for example, can be used as the shaft as the rotation angle detection object.

In the above embodiments, the case where the target 31 is a dipole magnet has been described, but it is not limited to this case, the target 31 may be, e.g., a metal projection and the first sensor 35 may be, e.g., a proximity switch of capacitive type. In other words, the first sensor 35 may be, e.g., an optical type as long as the output signal changes when the target 31 passes between the steering shaft 11 and the first sensor 35 due to rotation of the steering shaft 11. If the first sensor 35 is an optical type, a reflective material can be used as the target 31, for example.

The invention claimed is:

1. A rotation angle detection device for detecting the absolute angle of a shaft rotating with respect to a non-rotating member over a plurality of revolutions, comprising:

at least one target rotating in unison with the shaft;

a rotating member mechanically engaged with the shaft for rotating at a different rotation speed from the shaft as the shaft rotates;

a first sensor adjacent to a circular path of the of the target whose output signal changes when the target is approached;

a second sensor adjacent to the rotating member that detects a rotation angle of the rotating member within one rotation; and a computing section that calculates the absolute angle of the shaft based on the output signal of the first sensor and the rotation angle of the rotating member detected by the second sensor, wherein the output signal of the first sensor changes at a period different from a rotation period of the rotating member when the shaft rotates, and wherein the computing section detects the absolute angle of the shaft at that time from the rotation angle of the rotating member when the output signal of the first sensor changes.

2. The rotation angle detection device, according to claim 1, further comprising: a drive gear provided on an outer periphery of the shaft and rotating together with the shaft, wherein the rotating member is a driven gear that meshes and rotates with the drive gear.

3. The rotation angle detection device, according to claim 2, wherein a pitch circle diameter of the driven gear is smaller than one half a pitch circle diameter of the drive gear.

4. The rotation angle detection device, according to claim 2, further comprising: a case member fixed to the non-rotating member, wherein a portion of the rotating member protrudes through an opening formed in the case member, and the protruding portion of the rotating member is meshed with the drive gear.

5. The rotation angle detection device, according to claim 1, wherein the target is a magnet fixed to the shaft, and the first sensor is a magnetic field switch that outputs a pulse signal when the target is approached.

6. The rotation angle detection device of claim 5, further comprising: a case member fixed to the non-rotating member, wherein a portion of the first sensor is housed in a window portion formed in the case member.

7. The rotation angle detection device, according to claim 1, wherein a magnet is fixed to a center of the rotating member, and the second sensor is a magnetic field sensor capable of detecting intensities of magnetic fields in two directions perpendicular to a rotation axis of the rotating member.

8. The rotation angle detection device, according to claim 1, wherein the shaft is a steering shaft connected to a steering member of a vehicle, and the output signal of the first sensor changes near a neutral position of the steering member.

\* \* \* \* \*